United States Patent
Han et al.

(10) Patent No.: US 8,861,462 B2
(45) Date of Patent: Oct. 14, 2014

(54) METHOD AND APPARATUS FOR TRANSMITTING AN UPLINK OR DOWNLINK GRANT IN A WIRELESS COMMUNICATION SYSTEM THAT SUPPORTS UPLINK AND DOWNLINK MIMO SCHEMES

(75) Inventors: Seung Hee Han, Anyang-si (KR); So Yeon Kim, Anyang-si (KR); Sung Ho Moon, Anyang-si (KR); Yeong Hyeon Kwon, Anyang-si (KR); Hyun Soo Ko, Anyang-si (KR); Jae Hoon Chung, Anyang-si (KR); Min Seok Noh, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 139 days.

(21) Appl. No.: 13/510,538

(22) PCT Filed: Dec. 16, 2010

(86) PCT No.: PCT/KR2010/009010
§ 371 (c)(1),
(2), (4) Date: May 23, 2012

(87) PCT Pub. No.: WO2011/074887
PCT Pub. Date: Jun. 23, 2011

(65) Prior Publication Data
US 2012/0230291 A1    Sep. 13, 2012

Related U.S. Application Data

(60) Provisional application No. 61/287,178, filed on Dec. 16, 2009.

(30) Foreign Application Priority Data

Jul. 14, 2010    (KR) .......................... 10-2010-0067857

(51) Int. Cl.
*H04W 74/00*    (2009.01)
*H04L 1/00*    (2006.01)

(52) U.S. Cl.
CPC ............ *H04L 1/0006* (2013.01); *H04L 1/0061* (2013.01); *H04L 1/0072* (2013.01); *H04L 1/0028* (2013.01)
USPC ........... 370/329; 370/328; 370/338; 455/527; 455/528

(58) Field of Classification Search
CPC ............ H04W 72/1294; H04W 72/14; H04W 7299/00
USPC .............. 370/310.2, 315, 328–329, 335–336, 370/338–339; 455/524, 527–528, 561–562
See application file for complete search history.

(56) References Cited

U.S. PATENT DOCUMENTS

| | | | |
|---|---|---|---|
| 8,260,356 B2 * | 9/2012 | Nam et al. | 455/561 |
| 8,379,581 B2 * | 2/2013 | Imamura | 370/329 |
| 8,498,243 B2 * | 7/2013 | Tsai et al. | 370/328 |
| 8,582,538 B2 * | 11/2013 | Love et al. | 370/335 |

OTHER PUBLICATIONS

ITRI, "Carrier Identification in PDCCH", 3GPP TSG RAN WG1 Meeting #57bis, R1-092683, Jun. 29-Jul. 3, 2009, 3 pages provided.

(Continued)

*Primary Examiner* — Charles C Jiang
*Assistant Examiner* — Mohamed Kamara
(74) *Attorney, Agent, or Firm* — Birch, Stewart, Kolasch & Birch, LLP

(57) ABSTRACT

The present invention relates to a method for transmitting an uplink or downlink grant in a wireless communication system that supports uplink and downlink multiple input multiple output (MIMO) schemes. The method comprises: determining a downlink control information (DCI) format for an uplink or downlink grant to generate control information: attaching a cyclic redundancy check (CRC) for detecting an error in the created control information; and channel-coding the CRC-attached control information, wherein the control information comprises a bit flag for distinguishing whether the grant is an uplink grant or a downlink grant.

6 Claims, 14 Drawing Sheets

(56) References Cited

OTHER PUBLICATIONS

Motorola, "DCI for uplink non-contiguous RB allocations", 3GPP TSG RAN1 #57bis, R1-092647, Jun. 29-Jul. 3, 2009, 5 pages provided.

Motorola, "PDCCH Design for Carrier Aggregation and Post Rel-8 features", 3GPP TSG RAN1 #57bis, R1-092641, Jun. 29-Jul. 3, 2009, 5 pages provided.

Nokia, Nokia Siemens Networks, "Handling DCI formats and blind decoding in LTE-Advanced", 3GPP TSG-RAN WG1 Meeting #57bis, R1-092570, Jun. 29-Jul. 3, 2009, 6 pages provided.

* cited by examiner

METHOD AND APPARATUS FOR TRANSMITTING AN UPLINK OR DOWNLINK GRANT IN A WIRELESS COMMUNICATION SYSTEM THAT SUPPORTS UPLINK AND DOWNLINK MIMO SCHEMES

CROSS REFERENCE TO RELATED APPLICATIONS

This application is the National Phase of PCT/KR2010/009010 filed on Dec. 16, 2010, which claims priority under 35 U.S.C. 119(e) to U.S. Provisional Application No. 61/287,178 filed on Dec. 16, 2009, and under 35 U.S.C 119(a) to Patent Application No. 10-2010-0067857 filed in the Republic of Korea on Jul. 14, 2010, all of which are hereby expressly incorporated by reference into the present application.

TECHNICAL FIELD

The present invention relates to a wireless communication system, and more particularly, to a method and apparatus for transmitting an uplink or downlink grant in a wireless communication system that supports uplink and downlink multiple input multiple output (MIMO) schemes.

BACKGROUND ART

Multiple-carrier system or carrier aggregation system indicates the system that uses at least one aggregated carrier having a bandwidth smaller than a target bandwidth in configuring a broadband to support. When the at least one carrier having the bandwidth smaller than the target bandwidth is aggregated, a band of the aggregated at least one carrier may be limited to a bandwidth used by a previous system for the backward compatibility with the previous system. For instance, the legacy 3GPP LTE system supports bandwidths of 1.4 MHz, 3 MHz, 5 MHz, 10 MHz, 15 MHz and 20 MHz. And, LTE-A (LTE-advanced) system is set to support a bandwidth greater than 20 MHz using the bandwidths supported by the LTE. Alternatively, it may be able to support carrier aggregation by defining a new bandwidth irrespective of a bandwidth used by a previous or legacy system.

Multi-carrier is the name that may be interchangeably used together with carrier aggregation or bandwidth aggregation. And, the carrier aggregation may inclusively indicate contiguous carrier aggregation and non-contiguous carrier aggregation (spectrum aggregation).

In order to use multi-carrier efficiently, a technique for one higher layer (e.g., a series of layers including MAC layer, RRC layer and PDCP layer) to manage PHY layers for controlling several carriers respectively is explained as follows.

FIG. 1 is a diagram for one example of a concept for a base station to manage downlink component carriers and FIG. 2 is a diagram for one example of a concept for a user equipment to manage uplink component carriers. For clarity and convenience of the following description, a higher layer in FIG. 1 or FIG. 2 is schematized as a MAC.

FIG. 3 is a diagram for describing a concept for one MAC to manage multiple carriers in viewpoint of a transmission by a base station. And, FIG. 4 is a diagram for describing a concept for one MAC to manage multiple carriers in viewpoint of a reception by a user equipment. In the drawings, in order to effectively transmit and receive multiple carriers, both a transmitter and a receiver should be capable of transmitting and receiving the multiple carriers.

In brief, one MAC manages and operates at least one frequency carrier to transmit and receive. Since frequency carriers managed by one MAC need not to be contiguous with each other, resource management can advantageously become more flexible. One PHY in FIG. 3 or FIG. 4 is set to mean one component carrier for clarity and convenience of the following description. In this case, it may be not mandatory for one PHY to mean an independent RF (radio frequency) device. Generally, one independent RF device means one PHY, by which the one independent RF device is non-limited. Alternatively, one RF device may include several PHYs.

FIG. 5 is a diagram for describing a concept for at least one MAC to manage multiple carriers in viewpoint of a transmission by a base station. And, FIG. 6 is a diagram for describing a concept for at least one MAC to manage multiple carriers in viewpoint of a reception by a user equipment. FIG. 7 is a diagram for describing a concept for at least one MAC to manage multiple carriers in viewpoint of a transmission by a base station. And, FIG. 8 is a diagram for describing a concept for at least one MAC to manage multiple carriers in viewpoint of a reception by a user equipment.

In addition to the structures shown in FIG. 3 and FIG. 4, multiple carriers can be controlled not by one MAC but by at least one or more MACs, as shown in FIGS. 5 to 8.

Referring to FIG. 5 and FIG. 6, each carrier can be 1-to-1 controlled by each MAC. Referring o FIG. 7 and FIG. 8, each carrier can be 1-to-1 controlled by each MAC for some carriers and the rest of at least one or more carriers can be managed by one MAC.

The above-described system is the system that includes at least one or more carriers of which number ranges 1 to N. And, each of the carriers may be usable contiguously or non-contiguously. This is applicable irrespective of uplink or downlink. In case of TDD system, N multiple-carriers are configured to operate in a manner that UL (uplink) and DL (downlink) transmissions are included in each carrier. In case of FDD system, multiple carriers are configured to be usable in each of UL (uplink) and DL (downlink).

Although a UL and a DL are set to differ from each other in bandwidth in a legacy system, transmission and reception in a single carrier are basically supported. Yet, the system of the present invention may be able to operate multiple carriers through the carrier aggregation mentioned in the foregoing description. Besides, FDD system may be able to support asymmetric carrier aggregation in which UL and DL differ from each other in the number of aggregated carriers and/or a carrier bandwidth.

Carrier aggregation, in which at least two component carriers are aggregated, may be taken into consideration to support a wider transmission band (e.g., 100 MHz) and spectrum aggregation.

In accordance with performance, a user equipment may be able to simultaneously receive or transmit one component or a plurality of component carriers.

A user equipment having the reception and/or transmission capability for carrier aggregation is able to simultaneously perform reception and/or transmission via multiple component carriers. And, a legacy user equipment is able to perform reception or transmission via a single component carrier.

When the number of aggregated component carriers of UL is equal to that of aggregated component carriers of DL, it may be possible to configure all component carriers of a legacy system. Yet, a component carrier, which does not take compatibility into consideration, is not excluded by the present invention.

It may be possible for a user equipment to be configured to aggregate component carriers of which number and band in UL are different from those in DL, respectively. In typical TDD, the number and band of component carriers in UL may be equal to those of component carriers in DL.

Regarding MAC-PHY (media access control-physical) interface, in viewpoint of a user equipment, assuming that there is no space multiplexing, one HARQ (hybrid automatic repeat request) entity may exist in each scheduled component carrier. Each transport block is mapped to a single component carrier. And, a user equipment may be simultaneously scheduled for a plurality of component carriers.

In symmetric carrier aggregation (i.e., a case that the number of aggregated UL component carriers is equal to that o DL component carriers), assuming that in a process for attaching an index to a PUCCH resource, all component carriers maintain compatibility with a legacy system, such principle of a legacy system (e.g., LTE Rel-8) as ACK/NACK bundling, channel selection scheme, ACK/NACK multiplexing via multi-sequence modulation is extended to be simplified. In this case, the ACK/NACK bundling is the scheme used to efficiently transmit to feed back a plurality of ACK/NACK informations and means to process and transmit a plurality of the ACK/NACK informations by using a logical AND operation or a logical OR operation. For instance, the bundling by using the logical AND operation is performed in a following manner. First of all, if at least one NACK exists in a plurality of ACK/NACK's, a NACK signal is transmitted. Secondly, only if a response of every signal is ACK as a result of decoding, ACK is transmitted. For another instance, the bundling by using the logical OR operation is performed in a following manner. First of all, if at least one ACK exists in a plurality of ACK/NACK's, an ACK signal is transmitted. Secondly, only if a response of every signal is NACK as a result of decoding, NACK is transmitted.

For clarity and convenience of the following description, when a PDCCH is transmitted on DL component carrier #0, it is assumed that a corresponding PDSCH is transmitted on DL component carrier #0. Yet, it is apparent that the corresponding PDSCH can be transmitted on another DL component carrier by applying cross-carrier scheduling.

For clarity and convenience of the following description, when a PDCCH is transmitted on DL component carrier #0, it is assumed that a corresponding PDSCH is transmitted on DL component carrier #0. Yet, it is apparent that the corresponding PDSCH can be transmitted on another DL component carrier by applying cross-carrier scheduling.

A control region is constructed with a logical CCE sequence including a plurality of control channel elements (CCEs). In the following description, the CCE sequence is a set of all CCEs configuring a control region in a single subframe. The CCE corresponds to a plurality of resource element groups. For instance, a CCE may correspond to 9 resource element groups. The resource element group is used in defining to map a control channel by a resource element. For instance, one resource element group may be configured with 4 resource elements.

A plurality of PDCCHs may be transmitted within a control region. The PDCCH carries such control information as scheduling allocation and the like. The PDCCH is carried on an aggregation of one or several contiguous CCEs (control channel elements). A format of PDCCH and the number of bits of available PDCCH are determined in accordance with the number of CCEs configuring the CCE aggregation.

In the following description, the number of CCEs used for PDCCH transmission is called a CCE aggregation level. And, the CCE aggregation level is a CCE unit to search for PDCCH. Moreover, a size of the CCE aggregation level is defined as the number of contiguous CCEs. For instance, the CCE aggregation level may include the element of {1, 2, 4, 8}.

Table 1 shows examples of a PDCCH format and the number of bits of available PDCCH in accordance with a CCE aggregation level.

TABLE 1

| PDCCH format | CCE aggregation level | Number of resource element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Control information carried on PDCCH is called downlink control information (hereinafter abbreviated DCI). The DCI carries UL schedule information, DL scheduling information, system information, UL power control command, control information for paging, control information for indicating a random access resource (random access channel: RACH) and the like. And, the DCI may be able to carry control information for indicating SPS (semi-persistent scheduling) activation. Moreover, the DCI may be able to carry control information for indicating SPS (semi-persistent scheduling) deactivation. In this case, the semi-persistent scheduling may be used for UP or DL VoIP (voice over internet protocol) transmission.

DCI formats may include Format 0 for PUSCH (physical uplink shared channel) scheduling, Format 1 for scheduling of one PDSCH (physical downlink shared channel) codeword, Format 1A for compact scheduling of one PDSCH codeword, Format 1B for scheduling of rank-1 of a single codeword in space multiplexing mode, Format 1C for very compact scheduling of DL-SCH (downlink shared channel), Format 1D for PDSCH scheduling in multi-user space multiplexing mode, Format 2 for PDSCH scheduling in closed-loop space multiplexing mode, Format 2A for PDSCH scheduling in open-loop space multiplexing mode, Format 3 for transmission of TPC (transmission power control) command for UL channel, and Format 3A for transmission of TPC (transmission power control) command for UL channel.

FIG. 9 is a flowchart for a configuration of PDCCH.

Referring to FIG. 9, a base station (BS) generates control information in accordance with a DCI format. The base station is able to select one DCI format from a plurality of DCI formats (DCI format 1, DCI format 2 . . . DCI format N) in accordance with a control information scheduled to be sent to a user equipment (UE). In a step S710, a cyclic redundancy check (hereinafter abbreviated CRC) for error detection is attached to the control information generated in accordance with each of the corresponding DCI formats. In this case, the CRC is masked with an identifier (e.g., this is called a radio network temporary identifier (RNTI)) in accordance with an owner or usage.

In case of PDCCH for a specific user equipment, the CRC can be masked with a unique identifier of the user equipment, e.g., C-RNTI (Cell-RNTI). In particular, the CRC may be scrambled together with the unique identifier of the user equipment. The RNTI for the specific user equipment may include one of a temporary C-RNTI, a semi-persistent C-RNTI and the like. The temporary C-RNTI is a temporary identifier of a user equipment and may be usable for the duration of a random access procedure. And, the semi-persistent C-RNTI may be useable to indicate semi-persistent scheduling activation.

In case of PDCCH for a paging message transmitted on PCH, the CRC may be masked with a paging identifier, e.g., a P-RNTI (Paging-RNTI).

In case of PDCCH for system information transmitted on DL-SCH, the CRC can be masked with a system information identifier, e.g., SI_RNTI (System Information-RNTI). In case of PDCCH for indicating a random access response in response to a transmission of a random access preamble of a user equipment, the CRC can be masked with RZ-RNTI (Random Access-RNTI). Table 2 shown in the following shows examples of an identifier that masks PDCCH.

TABLE 2

| Type | Identifier | Description |
| --- | --- | --- |
| UE-specific | C-RNTI, temporary C-RNTI, semi-persistent C-RNTI | used for a unique UE identification |
| Common | P-RNTI | used for paging message |
|  | SI-RNTI | used for system information |
|  | RA-RNTI | used for random access response |

If one of the C-RNTI, the temporary C-RNTI and the semi-persistent C-RNTI is used, the PDCCH carries control information for a corresponding specific user equipment. If another RNTI except the C-RNTI, the temporary C-RNTI and the semi-persistent C-RNTI is used, the PDCCH carries common control information received by every user equipment within a cell.

In a step S720, coded data is generated in a manner of performing channel coding on the CRC attached control information. In a step S730, a rate matching in accordance with a CCE aggregation level assigned to the PDCCH format is performed.

In a step S740, modulated symbols are generated in a manner of modulating the coded data. In particular, the modulated symbols configuring one PDCCH may have the CCE aggregation level set to one of 1, 2, 4 and 8. In a step S750, the modulated symbols are mapped to physical resource element (RE) [CCE to RE mapping].

FIG. 10 is a flowchart of PDCCH processing.

Referring to FIG. 10, in a step S810, a user equipment maps physical element to CCE [CCE to RE demapping]. In a step S820, since the user equipment is not aware of a specific CCE aggregation level to receive PDCCH, the user equipment performs demodulation on each CCE aggregation level. In a step S830, the user equipment performs a transmission rate dematching on a demodulated data. Since the user equipment is not aware what kind of control information having a specific DCI format it should receive, the user equipment performs the transmission rate dematching on each of the DCI formats. In a step S840, channel decoding is performed on the rate-dematched data in accordance with a code rate and CRC is then checked to detect whether error is generated. If the error is not generated, it means that the user equipment has detected its PDCCH. If the error is generated, the user equipment keeps performing blind decoding on another DCI format. In a step S850, after the user equipment has detected the PDCCH of its own, the user equipment removes CRC from the decoded data and then acquires control information necessary for itself.

A plurality of PDCCHs multiplexed for a plurality of user equipments can be transmitted in a control region of one subframe. A user equipment monitors the PDCCHs. In this case, the 'monitoring' means that the user equipment attempts to decode each of the PDCCHs in accordance with a monitored DCI format. In the control region allocated within the subframe, a base station does not provide the user equipment with information indicating where the corresponding PDCCH is located. The user equipment finds the PDCCH of its own by monitoring a set of PDCCH candidates in the subframe. This is called blind decoding. Trough the blind decoding, the user equipment performs both identification of the PDCCH transmitted to itself and decoding of the control information carried on the corresponding PDCCH. For instance, if CRC error is not detected from de-masking the corresponding PDCCH from its C-RNTI, the user equipment may detect its PDCCH.

In order to effectively reduce overhead of the blind decoding, the number of DCI formats carried on PDCCH is limitedly defined. The number of the DCI formats becomes smaller than types of heterogeneous control informations transmitted on PDCCH. The DCI format may include a plurality of different information fields. In accordance with the DCI format, a type of an information field configuring the DCI format, the number of information fields, the number of bits of each information field and the like vary. And, a size of control information matched with the DCI format varies in accordance with the DCI format. PDCCH transmission of each of the various control informations is performed using one of the limited number of the DCI formats. In particular, a random DCI format may be usable for the transmission of at least two control informations of different types. Hence, if a value of an information field of a DCI format is embodied into a specific value, partial information fields among a plurality of information fields may not be necessary for a control information. In particular, detailed values may not be defined in partial fields among a plurality of the information fields that configures the DCI format. Each of the partial information fields configuring the DCI format becomes a reserved field and may be then reserved in a state having an arbitrary value. This is to enable heterogeneous control informations of a plurality of types to be size-adapted into one DCI format [size adaptation]. Thus, if a reserved field exists in control information transmission, a base station inefficiently wastes transmission energy and transmission power for a corresponding reserved field transmission that is not used for any function. Therefore, when a control information is generated by being matched with a DCI format, the demand for a method of utilizing an unused information field among a plurality of information fields configuring the DCI format is rising.

FIG. 11 shows one example of a method of utilizing an unused information field among a plurality of information fields configuring a DCI format.

Referring to FIG. 11, control informations A, B and C, which differ from each other in type, are grouped together to use one DCI format. The control informations A, B and C are matched with one DCI format. In this case, the DCI format consists of a plurality of different information fields. The control information A is embodied in a manner that a specific value is given to all information fields. Each of the control informations B and C is embodied in a manner that a specific value is given to partial information fields of the corresponding DCI format. An information bit size of the control information A is the biggest within the group. This is because the control information A corresponds to a case that all information fields of the corresponding DCI format are meaningfully configured. The information bit size of the control information A becomes a reference information bit size. In order to have the size equal to the reference information bit size, the control information B or C has null information added thereto. Through this, each of the control informations in the group is fixed to the same information bit size.

Thus, heterogeneous control informations of a plurality of types are grouped to be matched with a randomly designated DCI format. Each individual control information is embodied by mapping a specific value to an information field configuring a corresponding DCI format. Random control informations in a group can be embodied by giving a specific value to all information fields of the corresponding DCI format. On the contrary, other control information in the group can be embodied by giving a specific value to partial information fields of the corresponding DCI format. In particular, other information fields of the corresponding DCI format do not need to be used to embody control information. In this case, a total size of the information fields used to embody the control information may be defined as an information bit size. The information bit size of the former control information is the biggest, whereas the information bit size of the latter control information is relatively small.

An information bit size in case of embodying a control information by giving a specific value to all information fields of a DCI format is set as a reference information bit size. The reference information bit size means a total size of the information fields configuring the DCI format or a size of the DCI format itself. If other control information in the group has an information bit size smaller than the reference information bit size, null information is added to have the information bit size equal to the reference information bit size. In particular, when a specific control information is embodied by designating a value to partial information fields among all information fields designated in the DCI format, the rest of the information fields failing to have a value designated thereto are used as the null information. In this case, the information field used as the null information may be called an error check field.

Null information is the information that is added to enable a control information to have a size equal to a reference information bit size of a matched DCI format. When a control information is generated in accordance with a DCI format, an unused partial information field may be used as null information. The null information has a specific value. For instance, an information field used as the null information may be set to a value of all 'o' bits or all '1' bits. Alternatively, a field used as the null information may be designated to a value of a binary code sequence already known to both a base station and a user equipment. This binary code sequence may be named a binary scramble code sequence. For example, this code sequence can be generated on the basis of a method of generating a binary bit sequence already known to both a base station and a user equipment, an m-sequence or a gold sequence generated by a base station and a user equipment using the same input parameter.

An information field used as a null information may be set in advance between a base station and a user equipment. Alternatively, a base station may be able to inform a user equipment of an information on an information field used as a null information through RRC signaling or system information.

When a user equipment monitors PDCCH through CRC error detection, the following errors may occur. First of all, the user equipment may recognize PDCCH belonging to another user equipment as its PDCCH. Secondly, if demaksing is performed using an RNTI different from an actual RNTU, the user equipment may not detect an CRC error but may recognize that decoding is correctly performed. Such an error is called a false positive error. In order to lower the occurrence possibility of the false positive error, null information may be utilized as a probe for a virtual CRC check or an additional error check.

As a radio resource scheduling scheme, there is a dynamic scheduling scheme, a persistent scheduling scheme, a semi-persistent scheduling (SPS) scheme. The dynamic scheduling scheme is the scheme of requesting scheduling information each time data is transmitted or received. On the other hand, the persistent scheduling scheme is the scheme of not requesting scheduling information via a control signal each time data is transmitted or received, using preset information. The semi-persistent scheduling scheme is the scheme of not requesting scheduling information via a control signal each time data is transmitted or received for a semi-persistent scheduling interval. The semi-persistent scheduling interval is initiated by a reception of control information indicating a semi-persistent scheduling activation and may expire by a reception of control information indicating a semi-persistent scheduling deactivation. Alternatively, the semi-persistent scheduling interval may be set through an RRC signaling.

FIG. 12 is a flowchart for a DL data transmission using a dynamic scheduling scheme. A base station transmits DL grant on PDCCH to a user equipment each time transmitting DL data on PDSCH. Using the DL grant received on the PDCCH, the user equipment receives the DL data transmitted on the PDSCH. Therefore, it is advantageous in that the base station is able to schedule a radio resource appropriately in accordance with a DL channel condition.

FIG. 13 is a flowchart for a UL data transmission using a dynamic scheduling scheme. Before a user equipment transmits UL data on PUSCH, the user equipment receives allocation of a radio resource via a UL grant from a base station. In doing so, the UL grant is transmitted on PDCCH.

VoIP (Voice over IP) is the service of transmitting voice data via IP (internet protocol) and is a method of providing voice data, which was provided in a CS (circuit switched) domain, in a PS (packet switched) domain. The VoIP transmits voice data by connection-less, whereas the CS based voice service transmits voice data by maintaining an end-to-end connection. Hence, the VoIP is advantageous in using a network resource very efficiently.

Owing to the ongoing development of wireless communication technology, user data increases very fast and the conventional CS based services tend to be replaced by the PS based service considerably in order to user the limited network resources efficiently. In this context, the VoIP is being developed. And, it is expected that all voice services will be provided in the future via VoIP in most of wireless communication systems.

In order to effectively provide the PS based voice service, RTP (real-time transport protocol) has been developed and RTCP (RTP control protocol) for controlling the RTP has been developed as well. As the RTP carries time stamp information on each packet, it may be able to solve the Jitter problem. As a loss of RTP packet is reported via the RTCP, it may be able to lower FER (frame error rate) through a rate control. SIP (session initiation protocol), SDP (session description protocol) and the like have been developed as well as RTP/RTCP, it may be able to considerably solve a delay problem in a manner of maintaining an end-to-end virtual connection.

FIG. 14 is a diagram for one example of a traffic model in VoIP.

Referring to FIG. 14, types of voice packets generated in VoIP can be classified into a packet generated from a talk spurt and a packet generated from a silence period. For instance, assuming 12.2 kbps AMR (adaptive multi-rate), RTP packet is generated in the talk spurt by period of 20 ms and has a size of 35~49 bytes. In the silence period, RTP packet is generated by period of 160 ms and has a size of 10~24 bytes.

In such a voice service as VoIP, if a packet is generated by predetermined periods, the generated packet has a relatively small and uniform size. Hence, the VoIP generally uses a persistent scheduling scheme or a semi-persistent scheduling scheme. In case of the persistent scheduling scheme, a radio resource is persistently allocated by predicting it in a radio bearer setting process and a packet is correspondingly transmitted or received without a control signal containing scheduling information. When data is transmitted or received by the persistent scheduling scheme, since a preset radio resource is used instead of providing scheduling information, a channel condition is not taken into consideration at a timing point of transmitting or receiving data. Hence, if the channel condition is changed, a transmission error rate may be increased. The VoIP sets a talk spurt to a semi-persistent scheduling interval and is suitable for using the semi-persistent scheduling scheme.

FIG. 15 is a flowchart for a DL data transmission using semi-persistent scheduling. A base station transmits control information indicating a semi-persistent scheduling activation of resource allocation information to a user equipment on PDCCH. In the semi-persistent scheduling interval, the user equipment may be able to receive VoIP data from the base station via PDSCH using the resource allocation information.

FIG. 16 is a flowchart for a UL data transmission using semi-persistent scheduling. A base station transmits control information indicating a semi-persistent scheduling activation of resource allocation information to a user equipment on PDCCH. In the semi-persistent scheduling interval, the user equipment may be able to transmit VoIP data to the base station via PUSCH using the resource allocation information.

First of all, a method of transmitting control information indicating a semi-persistent activation via DCI format 0 is explained. Via the DCI format 0, control information for scheduling of PUSCH and control information indicating a semi-persistent scheduling activation can be transmitted. In this case, the semi-persistent activation may be usable for UL VoIP transmission.

Table 3 shows examples of control information carried on DCI format 0.

TABLE 3

| | Information Field | bit(s) |
|---|---|---|
| (1) | Flag for format0/format1A differentiation | 1 |
| (2) | Hopping flag | 1 |
| (3) | Resource block assignment and hopping resource Allocation | $\lceil \log_2(N_{RB}^{UL}(N_{RB}^{UL}+1)/2) \rceil$ |
| (4) | Modulation and coding scheme and redundancy Version | 5 |
| (5) | New data indicator | 1 |
| (6) | TPC command for scheduled PUSCH | 2 |
| (7) | Cyclic shift for DM RS | 3 |
| (8) | UL index (TDD) | 2 |
| (9) | CQI request | 1 |

DCI format 0 includes a plurality of information fields. The information fields include (1) flag field, (2) hopping flag field, (3) resource block assignment and hopping resource allocation field, (4) MCS (Modulation and Coding Scheme) and redundancy version field, (5) new data indicator field, (6) TPC command field, (7) cyclic shift field, (8) UL index field, and (9) CQI request field. A bit size of each of the information fields is just exemplary, by which a bit size of a field is non-limited.

The flag field is the field for differentiation between format 0 and format 1A. The resource block assignment and hopping resource allocation field may have a bit size of field vary in accordance with hopping PUSCH or non-hopping PUSCH. The resource block assignment and hopping resource allocation field for the non-hopping PUSCH provides $\lceil \log_2(N_{RB}^{UL}(N_{RB}^{UL}+1))/2 \rceil$ bits to a resource allocation of a 1$^{st}$ slot in a UL subframe. In this case, $N^{UL}_{RB}$ indicates the number of resource blocks included in a UL slot and is dependent on a UL transmission bandwidth set by a cell. The resource block assignment and hopping resource allocation field for the hopping PUSCH provides $\lceil \log_2(N_{RB}^{UL}(N_{RB}^{UL}+1))2 \rceil - N_{UL\_hop}$ bits to a resource allocation of a 1$^{st}$ slot in a UL subframe.

Control information of channel assignment for PDSCH is represented using all the fields mentioned in the above description. Hence, DCI format 1A for the channel assignment for PDSCH becomes a control information having an information size that becomes a reference.

If the number of information bits of the format 0 is smaller than that of information bits of the format 1A, '0' is appended to the format 0 until a payload size of the format 0 becomes equal to that of the format 1A.

Control information for scheduling of PUSCH is represented using all the fields mentioned in the above description. Hence, DCI format 0 for the scheduling of PUSCH becomes the control information having a reference information bit size.

Since the current LTE system supports 4×4 MIMO transmission in DL but does not support MIMO transmission in UL, a DCI format for the UL MIMO transmission does not exist. So to speak, a DL grant for DL MIMO exists and a UL grant (DCI format 0) for UL transmission of a single antenna exists only.

Therefore, in order to support 8×8 MIMO transmission in DL and 4×4 MIMO transmission in UL, a definition of a new DCI format for UL MIMO is requested.

Generally, since the increase of DCI formats raises a count of blind decodings that should be performed by a user equipment, complexity of the user equipment is increased correspondingly.

Therefore, a method of differentiating a DL grant and a UL grant from each other without increasing complexity of a user equipment in a manner of sharing formats of the DL grant and the UL grant not to raise a count of blind decodings is requested.

DISCLOSURE OF THE INVENTION

Technical Task

When MIMO is supported in UL and DL, a technical task of the present invention is to provide a method and apparatus for differentiating a DL grant and a UL grant from each other without increasing complexity of a user equipment in a manner of sharing formats of the DL grant and the UL grant not to raise a count of blind decodings.

Technical tasks obtainable from the present invention may be non-limited by the above mentioned technical tasks. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, in transmitting an uplink or downlink grant in a wireless communication system supporting UL and DL MIMO (multiple input multiple output), a method of transmitting a grant according to one embodiment of the present invention includes the steps of generating a control information by determining a downlink control information (DCI) format for the uplink or downlink grant, attaching a cyclic redundancy check (CRC) for detecting an error to the generated control information, and channel-coding the CRC-attached control information, wherein the control information comprises a bit flag to determine whether the grant is the uplink grant or the downlink grant. Preferably, the bit flag includes 1 bit.

To further achieve these and other advantages and in accordance with the purpose of the present invention, in transmitting an uplink or downlink grant in a wireless communication system supporting UL and DL MIMO (multiple input multiple output), a method of transmitting a grant according to another embodiment of the present invention includes the steps of generating a control information by determining a downlink control information (DCI) format for the uplink or downlink grant, attaching a cyclic redundancy check (CRC) for detecting an error to the generated control information, masking the CRC with a bit pattern for differentiating the UL grant and the DL grant from each other, and channel-coding the CRC-attached control information.

Preferably, the bit pattern for the uplink grant and the bit pattern of the DL grant are set to maximize a hamming distance in-between. Preferably, the bit pattern for the uplink grant and the bit pattern of the DL grant are differentiated from each other by a 1-bit value only. More preferably, the 1-bit value includes a least significant bit (LSB).

Advantageous Effects

According to the present invention, in a system that supports carrier aggregation, PUCCH and PHICH can be transmitted without malfunction or error of the system. Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE FOR INVENTION

Embodiments of the present invention may be supported by the standard documents disclosed in at least one of wireless access systems including IEEE (Institute of Electrical and Electronics Engineers) 802. 16m system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

In the following description, specific terminologies used for embodiments of the present invention are provided to help the understanding of the present invention. And, the use of the specific terminology may be modified into another form within the scope of the technical idea of the present invention.

A procedure performed by a base station according to the present invention shall be described as follows.

First of all, a base station may be able to transmit PDCCH by performing the following procedure for UL/DL grant transmission. In doing so, a user equipment detects a location of a corresponding grant and a CCE aggregation level by performing blind decoding and is then able to detect a DL/UL grant in reverse order.

Figure 1:
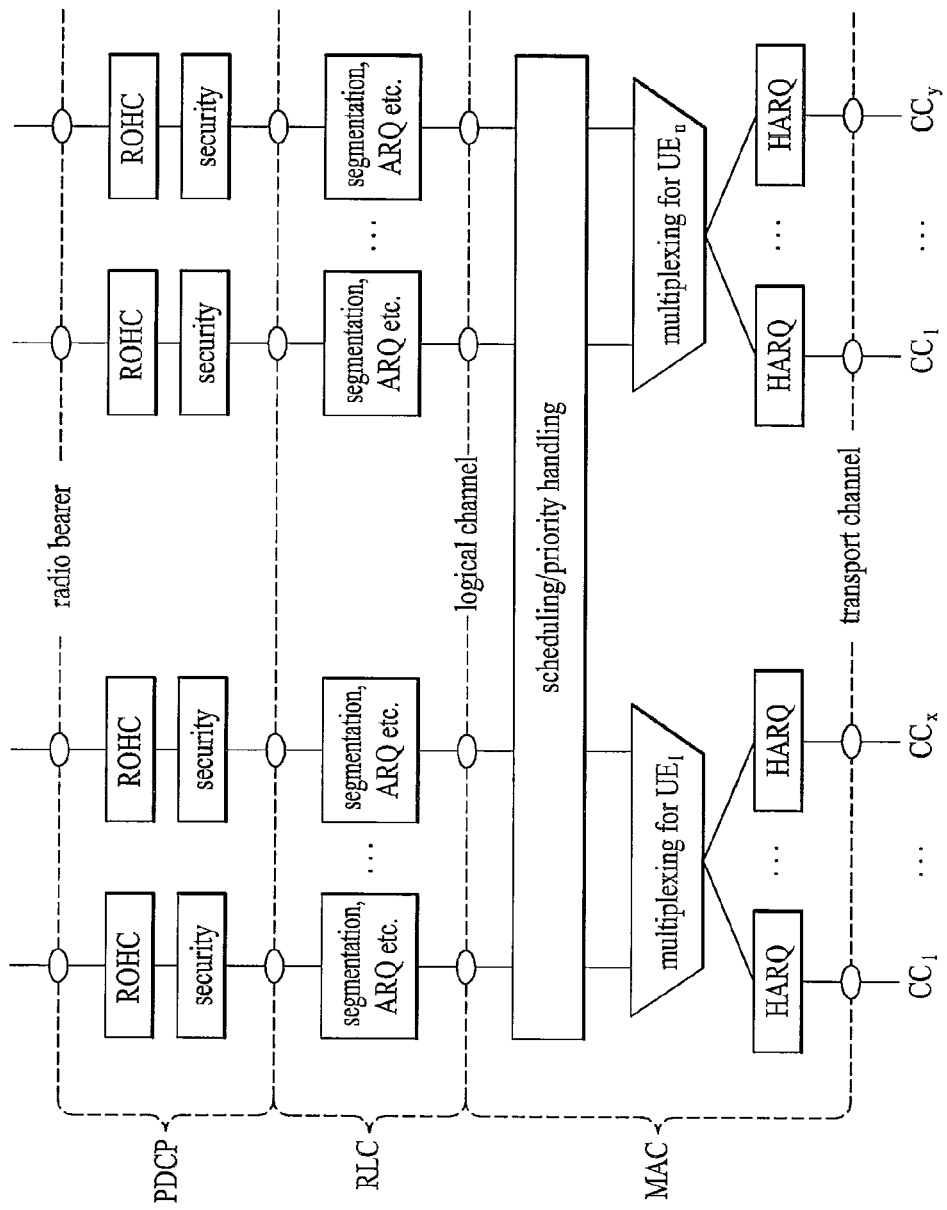
FIG. 1 is a diagram for one example of a concept for a base station to manage downlink component carriers.
Figure 2:
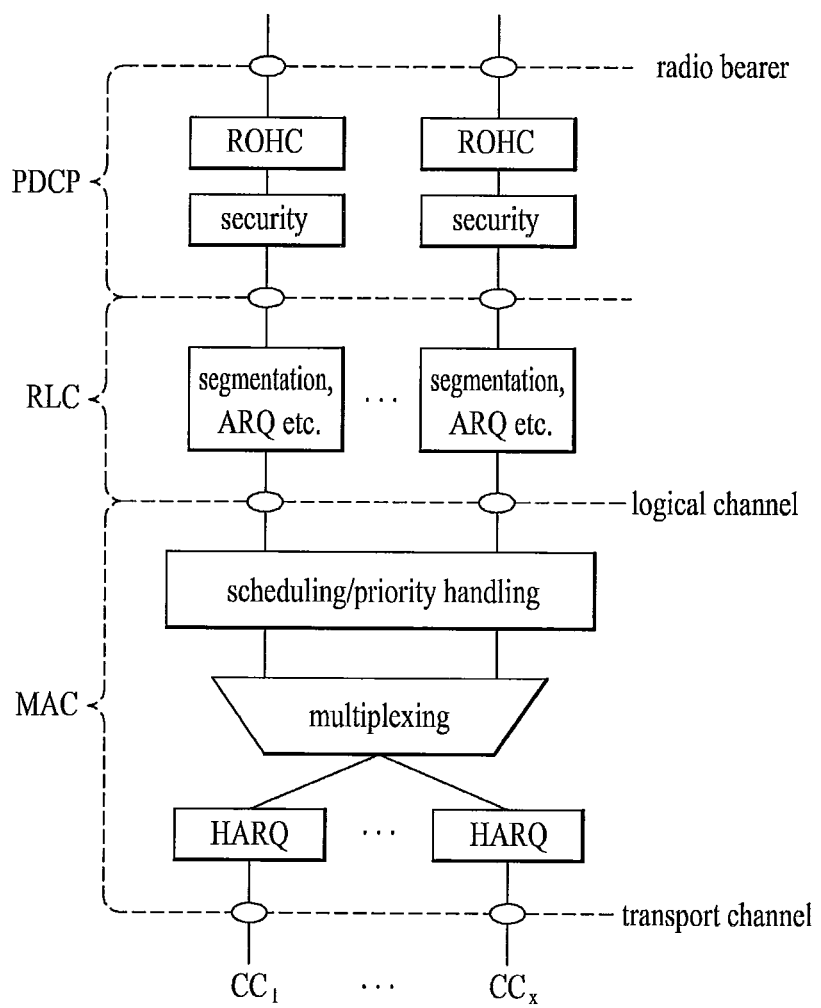
FIG. 2 is a diagram for one example of a concept for a user equipment to manage uplink component carriers.
Figure 3:
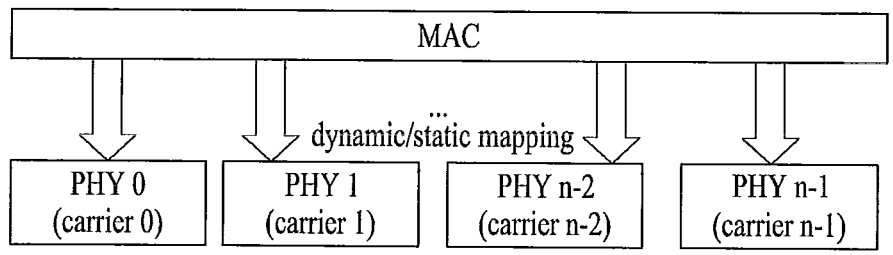
FIG. 3 is a diagram for describing a concept for one MAC to manage multiple carriers in viewpoint of a transmission by a base station.
Figure 4:
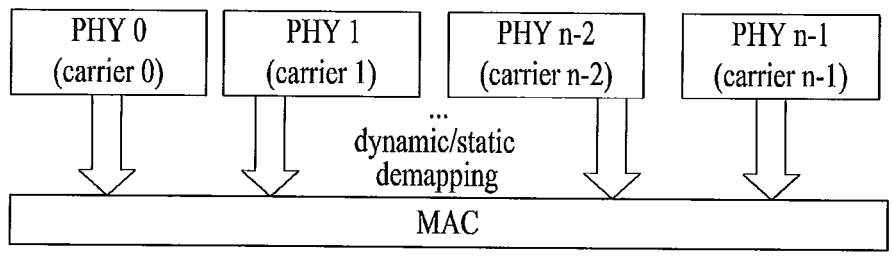
FIG. 4 is a diagram for describing a concept for one MAC to manage multiple carriers in viewpoint of a reception by a user equipment.
Figure 5:
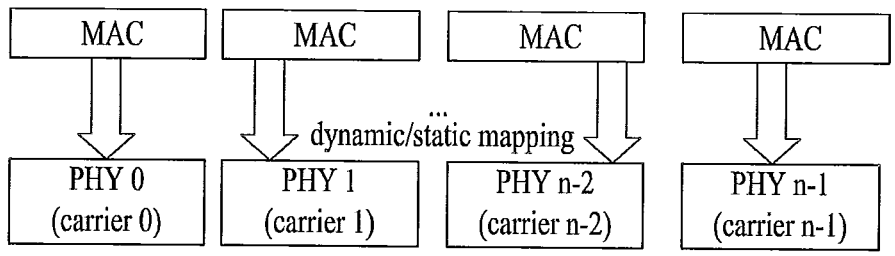
FIG. 5 is a diagram for describing a concept for at least one MAC to manage multiple carriers in viewpoint of a transmission by a base station.
Figure 6:
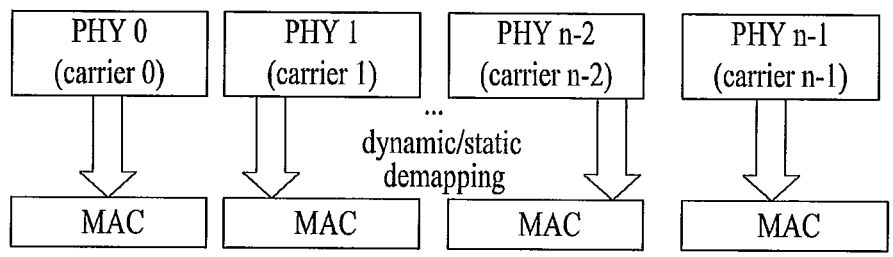
FIG. 6 is a diagram for describing a concept for at least one MAC to manage multiple carriers in viewpoint of a reception by a user equipment.
Figure 7:
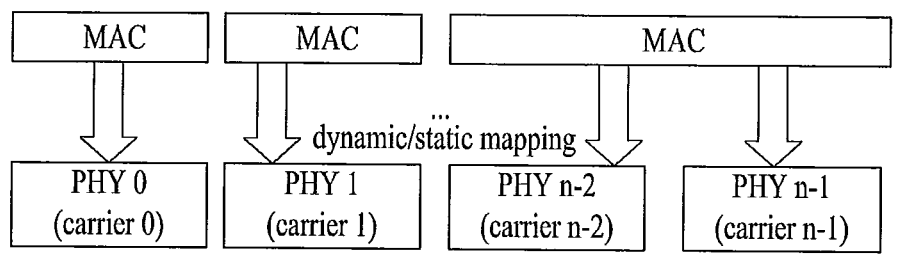
FIG. 7 is a diagram for describing a concept for at least one MAC to manage multiple carriers in viewpoint of a transmission by a base station.
Figure 8:
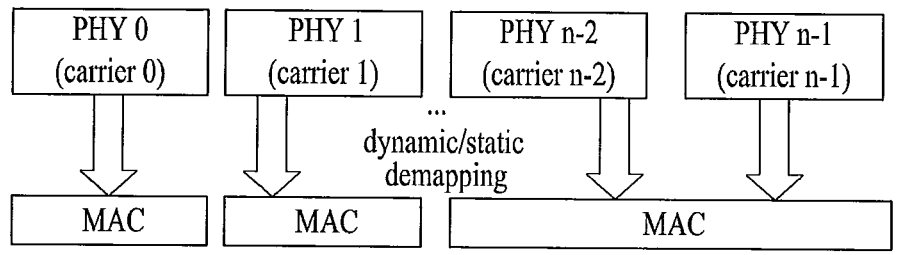
FIG. 8 is a diagram for describing a concept for at least one MAC to manage multiple carriers in viewpoint of a reception by a user equipment.
Figure 9:
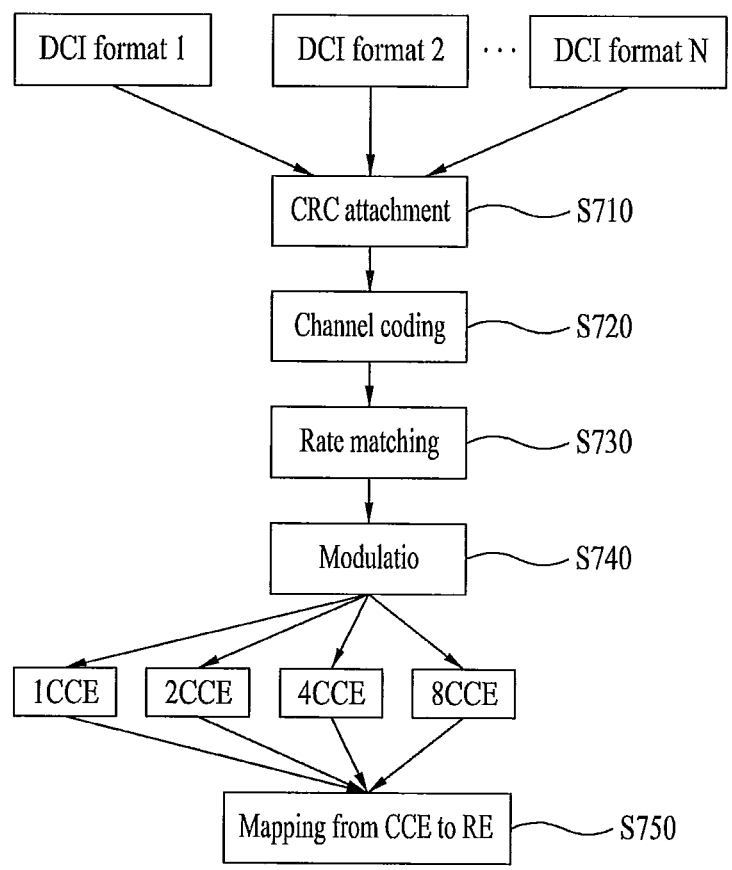
FIG. 9 is a flowchart for a configuration of PDCCH.
Figure 10:
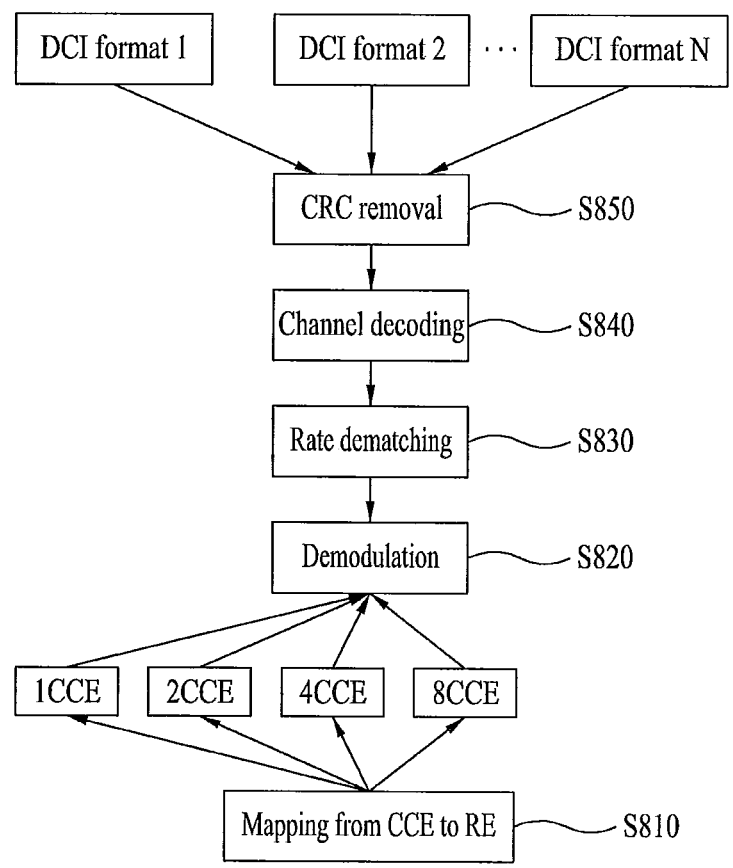
FIG. 10 is a flowchart of PDCCH processing.
Figure 11:
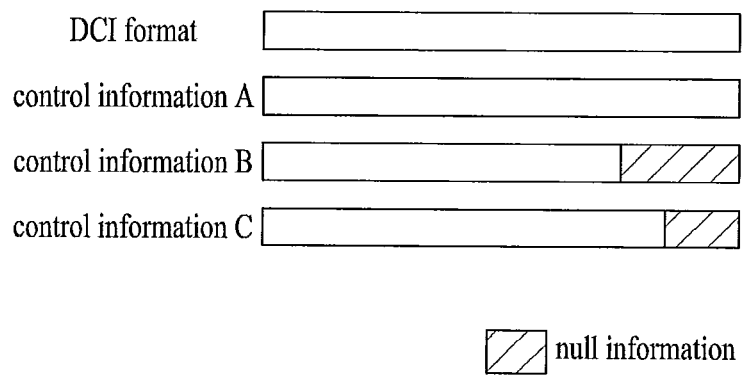
FIG. 11 shows one example of a method of utilizing an unused information field among a plurality of information fields configuring a DCI format.
Figure 12:
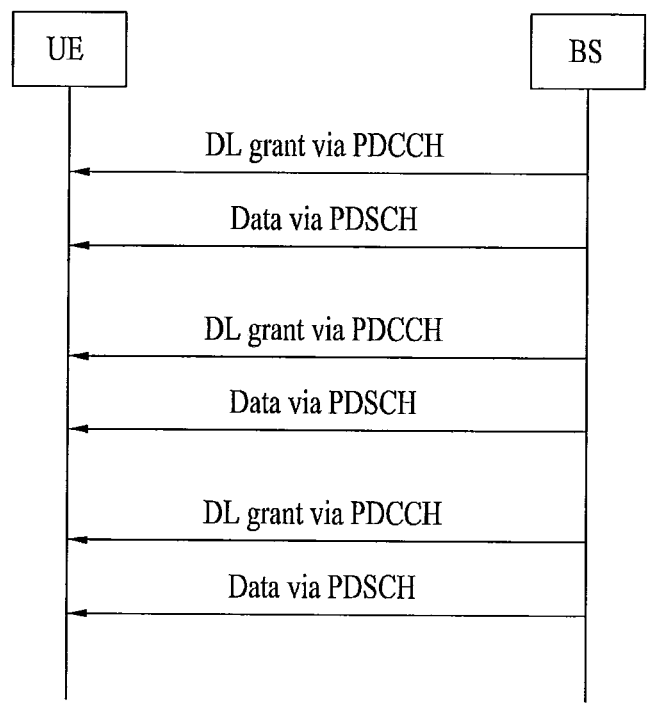
FIG. 12 is a flowchart for a DL data transmission using a dynamic scheduling scheme.
Figure 13:
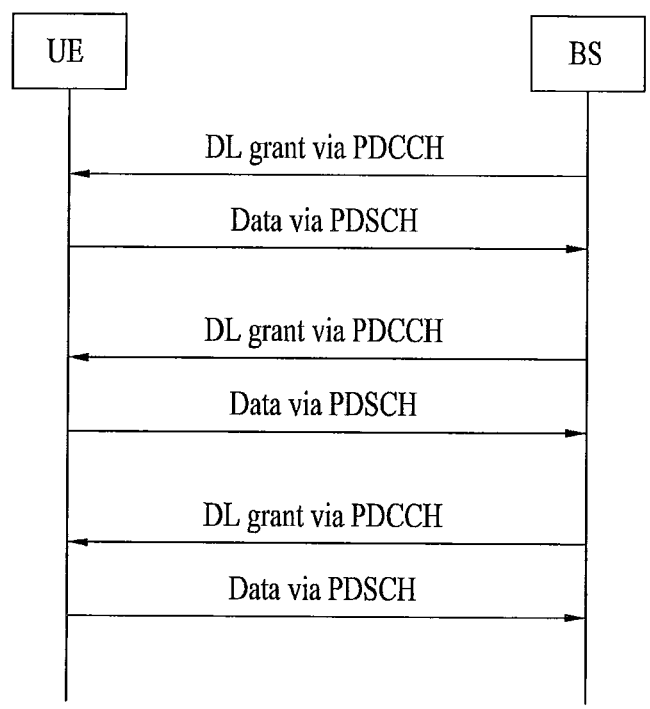
FIG. 13 is a flowchart for a UL data transmission using a dynamic scheduling scheme.
Figure 14:
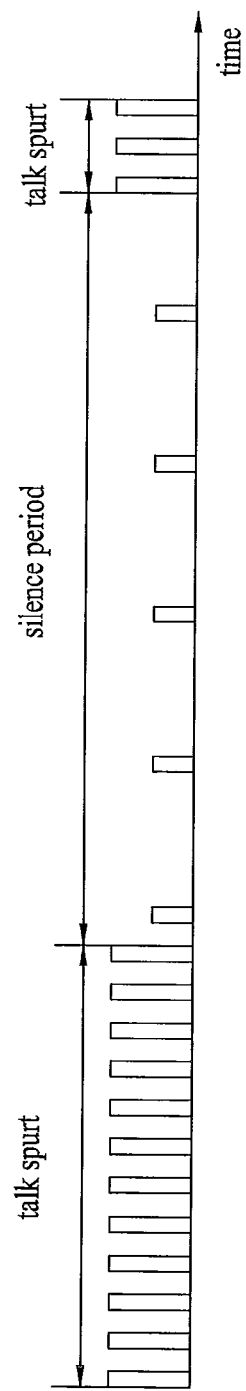
FIG. 14 is a diagram for one example of a traffic model in VoIP.
Figure 15:
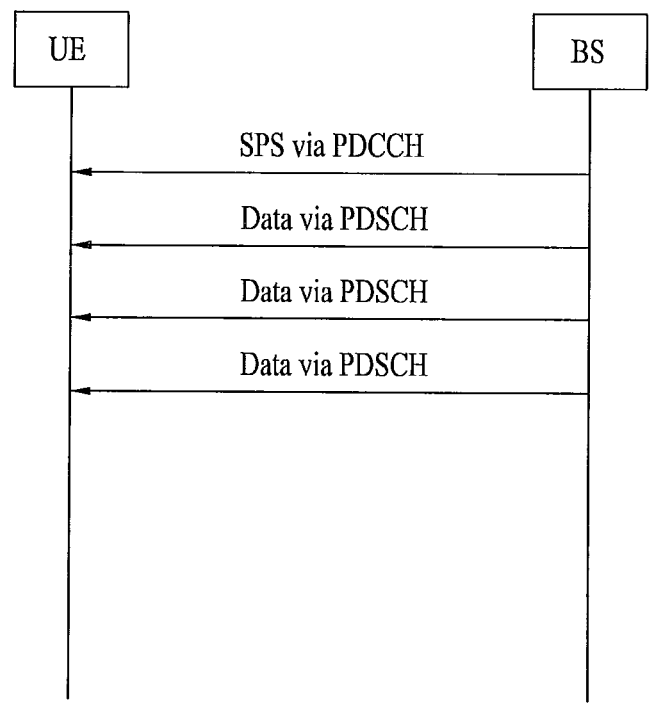
FIG. 15 is a flowchart for a DL data transmission using semi-persistent scheduling.
Figure 16:
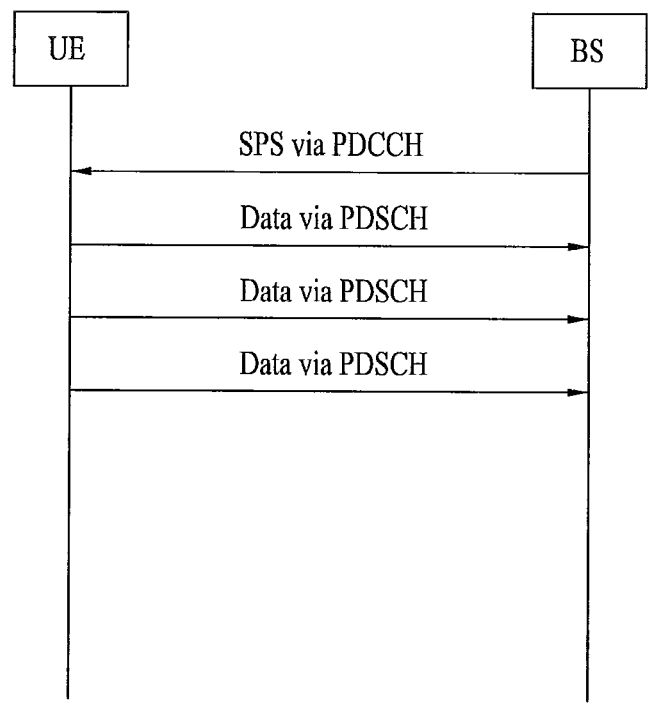
FIG. 16 is a flowchart for a UL data transmission using semi-persistent scheduling.
Figure 17:
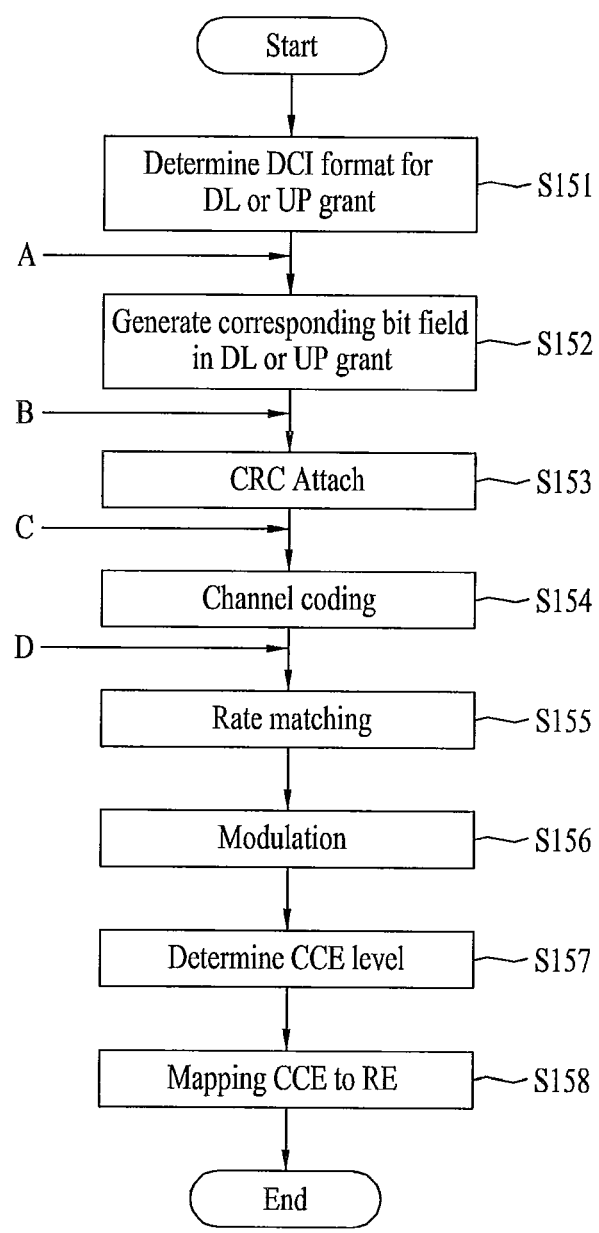
FIG. 17 is a diagram for describing a procedure for a UL or DL grant transmission according to one embodiment of the present invention.

FIG. 17 is a diagram for describing a procedure for a UL or DL grant transmission according to one embodiment of the present invention. Referring to FIG. 17, a DCI format for a DL or UL grant is determined [S151]. A bit field corresponding to the DL or UL grant is then generated [S152]. In doing so, sizes of the DL and UL grants can be adapted to each other [size adaptation]. For instance, the sizes of the DL and UL grants can be made equal to each other in a manner of appending padding bit(s) to a smaller one of the information of the DL grant and the information of the UL grant.

Subsequently, a CRC is attached to the generated signal [S153]. Channel coding is then performed [S154]. In doing so, it may be able to typically use a tail-biting convolutional coding scheme. Thereafter, a rate matching S155, a modulation S156, a CCE aggregation level determination (i.e., a sort of a link adaptation for PDCCH) S157 and a CCE to RE (resource element) mapping S158 are performed in order.

In doing so, a method for differentiating a DL grant and a UL grant may be applied to one of a position A (i.e., a position between the step S151 and the step S152), a position B (i.e., a position between the step S152 and the step S153), a position C (i.e., a position between the step S153 and the step S154), and a position D (i.e., a position between the step S154 and the step S155).

In the following description, a method of differentiating a DL grant and a UL grant from each other according to one detailed embodiment of the present invention is explained.

1$^{st}$ Embodiment

According to the present embodiment, a method of adding a bit flag for DL/UL grant is proposed. In particular, 1 bit is added into a DCI bit field or 1 bit may be set at a null bit position for DL/UL grant differentiation. After PDCCH decoding, a user equipment may be able to differentiate whether a corresponding DCI is for DL or UL via a bit flag. Alternatively, a prescribed portion of a previous bit field may be usable for a DL/UL grant.

2$^{nd}$ Embodiment

According to the present embodiment, a method of scrambling a bit level in a bit field is proposed. Generally, in order to randomize inter-cell interference, cell-specific scrambling is performed on an encoded bit of PDCCH. In doing so, a scrambled code can be generated by gold code based pseudo-random generation using each PCI (physical cell ID) as a seed. The scrambled code generated per PCI attempts inter-cell randomization in a manner of being performed at an encoded bit level.

The present invention proposes to perform scrambling in a manner of generating a DL or UL grant-specific scrambling code. Generally, this scrambling may be performed at a bit level or a modulated symbol level. For clarity and convenience of the following description, the bit level scrambling is taken as an example in this specification.

In the base station transmission procedure, the present embodiment may be applicable to one of the positions B, C and D. In doing so, when the scrambling code generated on the basis of gold code is used, a DL/UL grant parameter may be added to a generation seed value as well as PCI.

For instance, in a legacy system, a seed value of a scrambling code may be generated by Formula 1 based on PCI and slot number.

$$c_{int} = \lfloor n_S/2 \rfloor 2^9 + N_{ID}^{cell} \quad \text{[Formula 1]}$$

Hence, if a seed for the DL/UL grant is added thereto, it may be defined as Formula 2.

$$c_{int} = 2^{13} \cdot n_{grant} + \lfloor n_S/2 \rfloor 2^9 + N_{ID}^{cell} \quad \text{[Formula 2]}$$

In Formula 2, the $n_{grant}$ corresponds to a seed for a grant.

3$^{rd}$ Embodiment

According to the present embodiment, in order to differentiate whether a corresponding grant is provided for a DL or a UL, a CRC may be masked with a specific bit pattern. In doing so, a predetermined bit pattern, which is to mask the CRC, is defined in a manner of being differentiated for the DL or UL or may be used by defining DL-RNTI or UL-RNTI.

In particular, in defining DL-RNTI and UL-RNTI, it may be able to consider two kinds of methods as follows.

(1) Method of defining and using DL-RNTI and UL-RNTI by including C-RNTI (2) C-RNTI exists separately and masks a CRC. By additionally masking the CRC with DL-RNTI and UL-RNTI, a DL grant and a UL grant are differentiated from each other. For this, there are a method of previously designating DL-RNTI/UL-RNTI and identically applying the designated DL-RNTI/UL-RNTI irrespective of a cell/user and a method of signaling to use DL-RNTI/UL-RNTI through broadcasting (cell-specific RRC (radio resource control) or UE-specific RRC).

In this case, 'masking with DL-RNTI/UL-RNTI' may be applicable to the position C.

Embodiments mentioned in the following description relate to a method of previously designating DL/UL-RNTI to use and may be additionally performed on a masking C-RNTI in advance.

For first example of setting previously-designated DL-RNTI and UL-RNTI in advance, a hamming distance between two bit patterns can be set longest. For instance, assuming that DL-RNTI for masking CRC is set to {0, 0, 0, 0, 0, 0, 0, 0, 0, 0, 0, 0, 0, 0, 0, 0}, UL-RNTI may become {1,1,1,1,1,1,1,1,1,1,1,1,1,1,1,1} generated from complement operation of the DL-RNTI. If DL-RNTI is {0, 0, 1, 0, 0, 0, 0 1, 1, 0, 0, 1, 0, 0, 0, 0}, UL-RNTI may become {1, 1, 0, 1, 1, 1, 1, 0, 0, 1, 1, 0, 1, 1, 1}. Generally, if a user equipment mistakes a DL grant for a UL grant, and vice versa, it may cause an error fatal to a system operation. Hence, if the UL-RNTI and the DL-RNTI are set in the manner mentioned in the above description, it may be able to minimize the error of mistaking the DL grant for the UL grant or mistaking the UL grant for the DL grant.

For second example of setting previously-designated DL-RNTI and UL-RNTI in advance, only one of two bit patterns can be set to have a different bit value. For instance, if the DL-RNTI masking the CRC is {0, 0, 0, 0, 0, 0, 0, 0, 0, 0, 0, 0, 0, 0, 0, 0}, the UL-RNTI can become {0, 0, 0, 0, 0, 0, 0, 0, 0, 0, 0, 0, 0, 0, 0, 1} generated from complement operation of the DL-RNTI. If so, when a user equipment performs a CRC check, it may become advantageous in differentiating a DL grant and a UL grant via an LSB value and checking 15 bits in a fore part via C-RNTI. Thus, an error in differentiating an ID of the user equipment may increase into a minim value ranging $2^{-16}$ to $2^{-15}$. Moreover, when a base station schedules C-RNTI, it may facilitate the C-RNTI to be set to a value having a difference by 1.

In order to identify a specific mode, assume that CRC is masked with {0, 0, 0, 0, 0, 0, 0, 0, 0, 0, 0, 0, 0, 0, 0, 0} in case of an information A or {0, 0, 0, 0, 0, 0, 0, 0, 0, 0, 0, 0, 0, 0, 0, 1} in case of an information B. If it is additionally intended to differentiate a DL grant and a UL grant from each other, DL-RNTI may be set to {0, 0, 0, 0, 0, 0, 0, 0, 0, 0, 0, 0, 0, 0, 0, 0} and UL-RNTI may be set to {0, 0, 0, 0, 0, 0, 0, 0, 0, 0, 0, 0, 0, 1, 0}. In this case, it may be able to effectively set DL/UL-RNTI by avoiding collision with previously used masking information.

Figure 18:
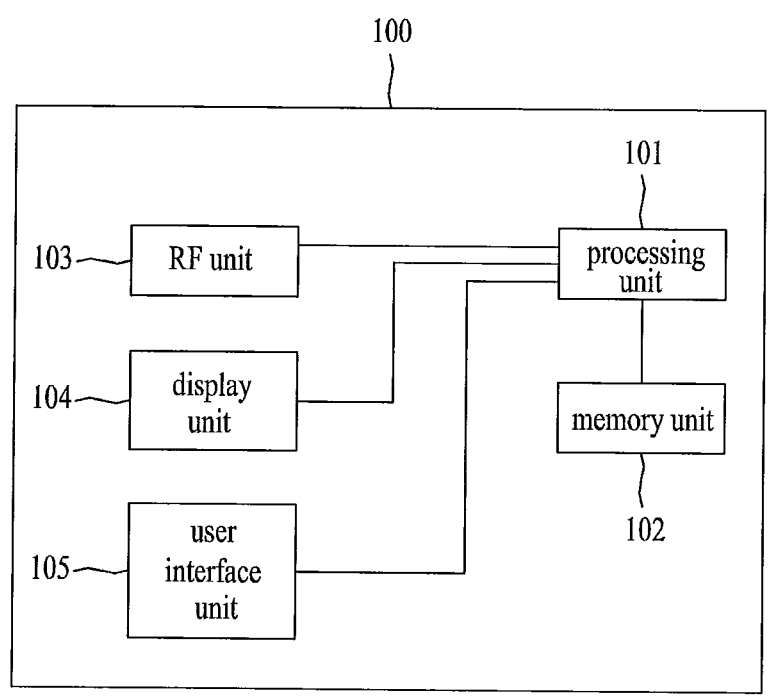
FIG. 18 is a block diagram for a configuration of a device applicable to a base station and a user equipment to implement the present invention.

The above-described method may be performed by such a device as follows. FIG. 18 is a block diagram for a configuration of a device applicable to a base station and a user equipment to implement the present invention. Referring to FIG. 18, a device 100 includes a processing unit 101, a memory unit 102, an RF (radio frequency) unit 103, a display unit 104 and a user interface unit 105. Layers of a physical interface protocol are performed by the processing unit 101.

The processing unit 101 provides a control plane and a user plane. Functions of the layers may be performed by the processing unit 101. First of all, the processing unit 101 is able to perform the above-described embodiments of the present invention. In particular, the processing unit 101 may perform a function of generating a subframe for user equipment location determination or a function of determining a location of the user equipment by receiving the subframe. The memory unit 102 is electrically connected to the processing unit 101. And, an operating system, applications and general files are saved in the memory unit 102. If the device 100 is a user equipment, the display unit 104 is able to display various kinds of informations. And, it may be able to implement the display unit 104 using such a well-known component as an LCD (liquid crystal display), an OLED (organic light emitting diode) and the like. And, the user interface unit 105 is connected to the processing unit 101 and can be configured by being combined with such a well-known user interface as a keypad, a touchscreen and the like. The RF unit 103 is electrically connected with the processing unit 101 and transmits or receives wireless signals.

The above-described embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In the present invention, a user equipment (UE) may be substituted with such a terminology as a mobile station (MS), a subscriber station (SS), a mobile subscriber station (MSS), a mobile terminal and the like.

Moreover, a UE of the present invention may include one of a PDA (Personal Digital Assistant), a cellular phone, a PCS (Personal Communication Service) phone, a GSM (Global System for Mobile) phone, a WCDMA (Wideband CDMA) phone, a MBS (Mobile Broadband System) phone and the like.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Accordingly, the present invention is applicable to a user equipment, a base station or other equipments in a wireless mobile communication system.

What is claimed is:

1. A method for transmitting an uplink (UL) or downlink (DL) grant in a wireless communication system supporting UL and DL multiple input multiple output (MIMO), the method comprising:
   generating control information by determining a downlink control information (DCI) format for the UL or DL grant;
   attaching a cyclic redundancy check (CRC) for detecting an error to the generated control information;
   channel-coding the CRC-attached control information; and
   scrambling the coded control information using a scrambling code,
   wherein the scrambling code is UL grant-specifically or DL grant-specifically determined based on an initial value $c_{int}$ in accordance with an Equation, $$c_{int}=2^{13} \cdot n_{grant}+\lfloor n_S/2 \rfloor 2^9 + N_{ID}^{cell}, \text{ and} \qquad \text{<Equation>}$$

wherein $n_s$ represents a slot number within a radio frame, $N_{ID}^{cell}$ represents a physical layer cell identity, and $n_{grant}$ represents a parameter indicating the UL or DL grant.

2. The method according to claim 1, wherein the scrambling the coded control information using the scrambling code is performed in a unit of a bit level.

3. The method according to claim 1, wherein the control information includes a bit flag to determine whether the grant is the UL or DL grant.

4. An apparatus in a wireless communication system, the apparatus comprising:
   a processing unit coupled to a memory, the processing unit configured to generate control information by determining a downlink control information (DCI) format for an uplink (UL) or downlink (DL) grant, attach a cyclic redundancy check (CRC) for detecting an error to the generated control information, channel-code the CRC-attached control information, and scramble the coded control information using a scrambling code,
   wherein the scrambling code is UL grant-specifically or DL grant-specifically determined based on an initial value $c_{int}$ in accordance with an Equation, $$c_{int}=2^{13} \cdot n_{grant}+\lfloor n_S/2 \rfloor 2^9 + N_{ID}^{cell}, \text{ and} \qquad \text{<Equation>}$$

wherein $n_s$ represents a slot number within a radio frame, $N_{ID}^{cell}$ represents a physical layer cell identity, $n_{grant}$ and grant represents a parameter indicating the UL or DL grant.

5. The apparatus according to claim 4, wherein the processing unit is further configured to scramble the coded control information using the scrambling code in a unit of a bit level.

6. The apparatus according to claim 4, wherein the control information includes a bit flag to determine whether the grant is the UL or DL grant.

* * * * *